Nov. 3, 1959 W. H. PARKER 2,910,749
SPRING CLIPS
Filed June 18, 1956
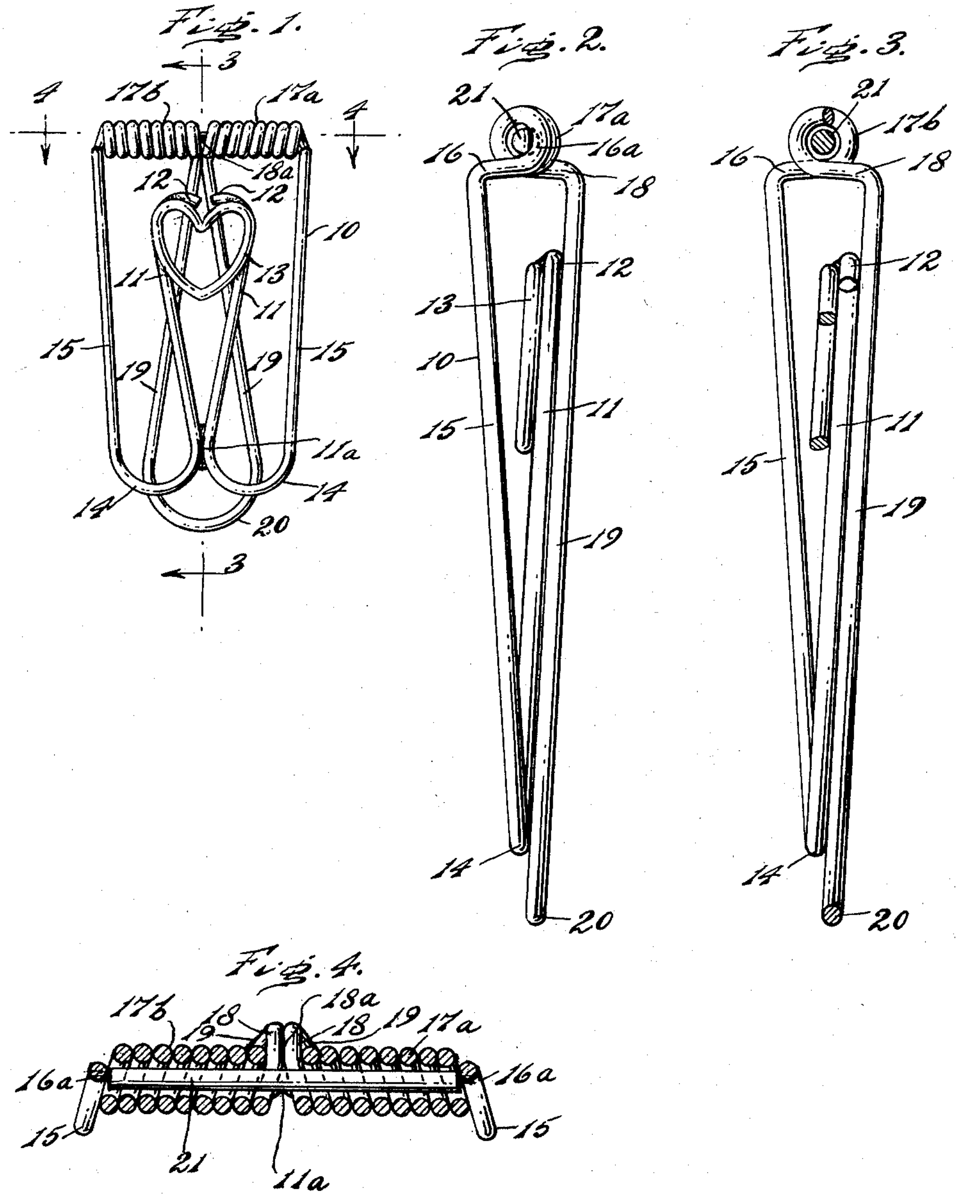
INVENTOR
William H. Parker
BY
B. T. Wobensmith 2nd
ATTORNEY United States Patent Office 2,910,749

Patented Nov. 3, 1959

2,910,749

SPRING CLIPS

William H. Parker, Philadelphia, Pa.

Application June 18, 1956, Serial No. 592,051

2 Claims. (Cl. 24—66)

This invention relates to spring clips.

Various spring clips have heretofore been proposed for holding groups of papers, money and the like but not all of these has proven wholly satisfactory.

Many of the spring clips heretofore proposed relied upon the torsional effect of a straight or arcuate piece of wire but these were readily deformed permanently by the stressing of the material beyond its elastic limit. Such deformed clips were thereafter unsuited for providing the desired clamping action.

Others of the spring clips heretofore available were made of relatively light wire and lacked adequate strength for repeated gripping.

It is the principal object of the present invention to provide a spring clip which will be free from the likelihood of permanent deformation in use.

It is a further object of the present invention to provide a spring clip with which a relatively large gripping force can be applied.

It is a further object of the present invention to provide a spring clip having a plurality of gripping locations.

It is a further object of the present invention to provide a spring clip having a gripping action applied from each end thereof.

It is a further object of the present invention to provide a spring clip which will be particularly suited for the attachment of an identifying emblem.

Other objects and advantageous features of the invention will be apparent from the specification and claims.

The nature and characteristic features of the invention will be more readily understood from the following description, taken in connection with the accompanying drawings forming part thereof, in which:

Figure 1 is a front elevational view of a spring clip in accordance with the invention;

Fig. 2 is a side elevational view, enlarged, of the spring clip shown in Fig. 1;

Fig. 3 is a longitudinal sectional view, enlarged, taken approximately on the line 3—3 of Fig. 1; and Fig. 4 is a transverse sectional view, enlarged, taken approximately on the line 4—4 of Fig. 1.

It should, of course, be understood that the description and drawings herein are illustrative merely, and that various modifications and changes can be made in the structure disclosed without departing from the spirit of the invention.

Referring now more particularly to the drawings, in which a preferred embodiment of the invention is illustrated, the spring clip there shown at 10 is made of wire and is provided with a pair of oppositely disposed inner arm portions 11 having opposed terminal ends 12. The ends 12 can be connected in any desired manner such as by an emblem 13 secured to the arm portions 11. The arms 11 converge to a location spaced from the ends 12 and can be and preferably are connected by solder, as at 11*a*.

Integral with the arm portions 11, arcuate portions 14 are provided which are connected by outer arm portions 15 to connecting portions 16 offset substantially perpendicularly out of the plane in which the outer arm portions 15 are disposed. The connecting portions 16 are connected to helical spring coils 17*a* and 17*b*, the coil 17*a* being a right handed coil and the coil 17*b* being a left handed coil. The connecting portions 16 are shaped as indicated at 16*a* to partially close the outer ends of the coils 17*a* and 17*b* and provide abutments at these locations.

The coils 17*a* and 17*b* have their longitudinal axes in alignment and at their inner meeting ends have offset portions 18 extending therefrom. The offset portions 18 can be connected by soldering, if desired, as indicated at 18*a*.

The offset portions 18 have diverging arm portions 19 connected thereto and the arm portions 19 are connected at their outer ends by an arcuate connecting portion 20. The connecting portion 20 preferably extends beyond the connecting portions 14, the arm portions 19 being made longer for this purpose.

The arm portions 19 and connecting portion 20 are disposed in the same plane, which plane is inclined with respect to but meets the plane in which the outer arm portions 15 are disposed, so that the connecting portion 20 engages the arcuate portions 14.

The inner arm portions 11 and their terminal ends 12 are disposed in a plane parallel to the plane of the arm portions 19 so that the arm portions 11 and 19 can engage at their meeting locations and the arm portions 19 and the terminal ends 12 can engage at their meeting locations.

The entire construction heretofore described is preferably made of a single piece of wire, bent to provide the shapes and arrangements indicated.

In order to retain the coils 17*a* and 17*b* in alignment a core piece 21 can be inserted therein prior to any soldering at 18*a*, and held against endwise displacement by the portions 16*a* as shown in Fig. 4.

It will be noted that the arm portions 19 and their connecting portion 20 can be separated as a unit, around the axis of the coils 17*a* and 17*b*, from the arm portions 11 for the insertion therebetween of articles to be gripped. By a further pivotal action, the arm portions 11 can be moved together into or substantially into the plane of the outer arm portions 15 against the spring force applied thereon by the arcuate portions 14 to permit the additional gripping action upon their return against the arm portions 19.

I claim:

1. A spring clip comprising a pair of oppositely directed longitudinally axially aligned spring coils of wire, a core piece disposed in said coils for maintaining said coils in linear alignment, a pair of spaced arms extending from the outer ends of said coils, and a pair of spaced arms extending from the inner ends of said coils, each of said coils at their junctions with said first pair of arms having portions offset across openings at the outer ends of said coils and retaining said core piece within said coils, and the ends of said respective pairs of arms remote from said coils being urged towards each other by said spring coils.

2. A spring clip comprising a pair of oppositely directed longitudinally axially aligned spring coils of wire, a core piece disposed in said coils for maintaining said coils in linear alignment, a pair of spaced arms extending from the outer ends of said coils, a pair of spaced arms extending from the inner ends of said coils, each of said coils at their junctions with said first pair of arms having portions offset across openings at the outer ends of said coils and retaining said core piece within said coils, the ends of said respective pairs of arms remote from said coils being urged towards each other by said spring coils, one of said pairs of arms at the ends thereof remote from said coil having an additional pair of arms resiliently connected thereto and extending therefrom in parallel relation therealong and towards said coils.

References Cited in the file of this patent

UNITED STATES PATENTS

| | | |
|---|---|---|
| 690,236 | Colwell | Dec. 31, 1901 |
| 747,077 | Lee | Dec. 15, 1903 |
| 1,053,663 | Snell | Feb. 18, 1913 |
| 1,803,110 | Gould | Apr. 28, 1931 |
| 2,447,996 | Biagi | Aug. 24, 1948 |
| 2,642,638 | Larrabee | June 23, 1953 |

FOREIGN PATENTS

| | | |
|---|---|---|
| 151,169 | Great Britain | Sept. 23, 1920 |
| 814,290 | Germany | Sept. 20, 1951 |